United States Patent [19]
Fletcher et al.

[11] 3,924,183
[45] Dec. 2, 1975

[54] FREQUENCY MEASUREMENT BY COINCIDENCE DETECTION WITH STANDARD FREQUENCY

[76] Inventors: James C. Fletcher, Administrator of the National Aeronautics and Space Administration with respect to an invention of; Edward J. Nossen, Cherry Hill, N.J.; Eugene R. Starner, Bethlehem, Pa.

[22] Filed: Sept. 13, 1974

[21] Appl. No.: 505,819

[52] U.S. Cl. .............................. 324/79 D; 328/134
[51] Int. Cl.² ........................................... G01R 23/00
[58] Field of Search ................. 324/79 D; 328/134

[56] References Cited
UNITED STATES PATENTS

| | | | |
|---|---|---|---|
| 3,450,991 | 6/1969 | Tarczy-Hornoch | 324/79 D |
| 3,518,540 | 6/1970 | Roberts | 324/79 D |
| 3,549,997 | 12/1970 | Rotzel | 324/79 D |
| 3,569,830 | 3/1971 | Gass | 324/79 D |

*Primary Examiner*—John S. Heyman
*Attorney, Agent, or Firm*—Marvin J. Marnock; John R. Manning; Marvin F. Matthews

[57] ABSTRACT

A method of measuring a desired frequency by comparing it with a standard frequency. The zero crossings of both frequencies are detected. A command pulse is generated at each coincidence and is used to start and stop a pair of frequency counters adapted to count the desired and standard frequencies. A measure of the desired frequency is obtained by multiplying the known standard frequency by the ratio between the desired count and the standard count obtained in the two frequency counters.

2 Claims, 2 Drawing Figures

FREQUENCY MEASUREMENT BY COINCIDENCE DETECTION WITH STANDARD FREQUENCY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

The need for measuring the frequency of oscillatory signals is ever increasing and many analog and digital techniques have been proposed and are widely used. Digital techniques especially are used in installations such as radar, collision avoidance, altimeters, navigation systems, space technology, etc. The primary source of error is very often the quantization ($\pm 1$ cycle) resulting from the digitizing process. Several methods have been proposed to reduce this error, however, most of them are either too time consuming or relatively inaccurate, and/or generate their own errors. For example, a simple proposed solution, for reducing the primary source of error in the digitizing process, is to increase the time over which the frequency is counted. This results in averaging the quantization error over a longer time interval and, hence, tends to improve the accuracy of the measured frequency. It was found, however, that increasing the time over which the frequency is counted may in fact also increase the errors resulting from the inherent assumption in this method that the measured frequency remains constant over the measured time interval, an assumption which is not always borne out in practice. Even when the frequency does remain relatively constant over the measured time interval, this method is, for some applications, too time consuming because one must wait until the end of the time interval over which the frequency is counted to arrive at a measurement of the unknown frequency. When accurate measurements are desired, such time interval may last several minutes.

Another known method employs a high-frequency oscillator to supply fractional cycle count between each cycle of the desired frequency. By using the fractional cycle count at the end of the measurement period, the above-mentioned quantization error in the digitizing process can be computed to an accuracy of several orders of magnitude better than the conventional scheme of counting whole cycles. The fractional cycle count method has the disadvantage that high-frequency oscillators are required with the concomitant need for high-speed counters.

A further known method is based on multiplying the desired frequency by some suitable constant to obtain a higher frequency. The higher frequency is counted and the desired frequency is obtained by dividing the count of the higher frequency by the known constant. This technique is only useful when the desired frequency has a relatively high signal-to-noise ratio, since the multiplication process on which this method is based invariably decreases the signal-to-noise ratio by an amount which is proportional to the square of the multiplying constant. Another disadvantage of this technique is that it requires high-speed counters and/or frequency down converters. Such counters and converters themselves introduce additional frequency drift errors into the frequency measurement. These errors adversely affect the accuracy of the frequency measurements.

It is, therefore, a main object of the present invention to provide an accurate method for measuring frequencies without introducing additional errors into the frequency measurements. The apparatus for carrying out the method can be micro-miniaturized and is relatively simple and inexpensive to construct. High-frequency resolutions ($10^{-2}$ to $10^{-3}$ Hz) can be achieved in a fraction of a second without the need for high-speed counters and/or frequency converters.

SUMMARY OF THE INVENTION

This invention relates to a method for measuring an unknown desired frequency $F_D$ by comparing it to a known standard frequency $F_o$. Each zero crossing of the desired frequency is detected and a narrow pulse is generated at each such crossing. Each zero crossing of the standard frequency is detected and a narrow pulse is generated at each such crossing. The detection of the desired frequency produces a train of desired narrow pulses, and the detection of the standard frequency produces a train of standard narrow pulses. The desired and standard trains of narrow pulses are compared for coincidence. A wide pulse is produced whenever the desired and standard pulse trains are coincident. The standard and desired frequencies are also applied to a standard and a desired counter, respectively. The coincident pulses are used as triggers to start and stop simultaneously the desired and standard counters. The desired counter provides for each measured period a desired count $N_d$ and the standard counter provides for the same time interval a standard count $N_o$. The measured frequency during each measured time interval is given by $F_D = (N_d/N_o) F_o$.

In a preferred embodiment of the method of the invention, the measured counts $N_d$ and $N_O$ are accumulated and stored for periodic sampling by a utilization device such as a computer or a display.

Figure 1:
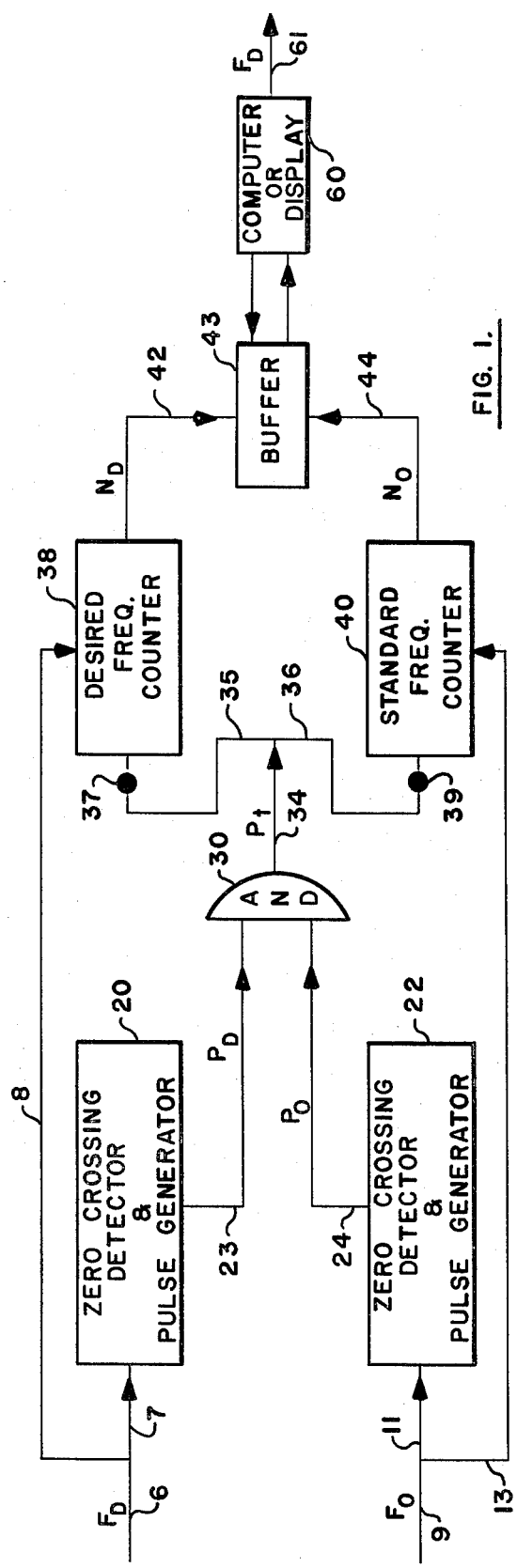
FIG. 1 shows a block diagram of a system for carrying out the method of this invention.

In the specification and claims, the oscillatory signal whose frequency it is desired to measure with great accuracy is herein called the "desired frequency" $F_D$. This frequency is compared with a known standard signal produced by a standard frequency oscillator and is herein called the "standard frequency" $F_O$.

The desired frequency $F_D$ arrives on line 6 which divides into lines 7 and 8. The standard frequency $F_o$ arrives on line 9 which divides into lines 11 and 13. Line 7 is connected to a zero-crossing detector and pulse generator 20, and line 11 is connected to a zero-crossing detector and pulse generator 22. The output lines 23 and 24 of generators 20 and 22, respectively, are connected to the input terminals of an AND gate 30 which generates a wide trigger pulse $P_t$ on its output line 34. Line 34 is divided into lines 35 and 36. Line 36 is connected to the command terminal 37 of a desired frequency counter 38 and line 36 is connected to the command terminal 39 of a standard frequency counter 40.

In a preferred modification of the embodiment of the invention, the count $N_d$ from counter 38 is fed on line 42 to a buffer 43 and the count $N_o$ from counter 40 is fed on line 44 to buffer 43. A utilization device, generally designated as 60, such as a computer or display can periodically sample the stored counts in the buffer 43 and from the sampled counts compute the desired frequency $F_D$. A measure of the desired frequency is made available on output line 61.

Figure 2:
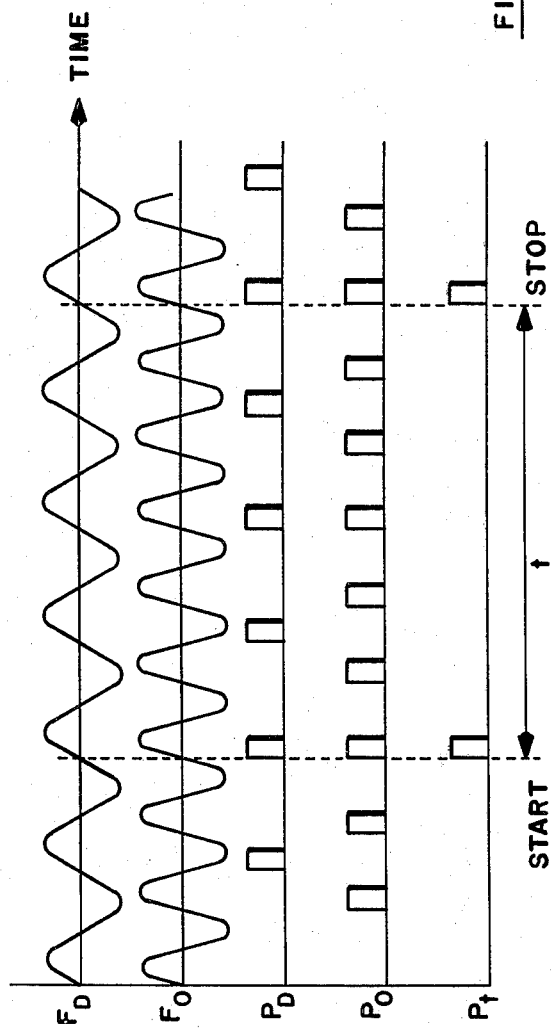
FIG. 2 shows typical wave forms and measurement timing intervals.

FIG. 2 illustrates the operation of the embodiment shown in FIG. 1.

The curve $F_D$ represents a typical waveform of a desired frequency. $F_O$ represents a typical standard frequency. Both frequencies are counted for a time period $t$ which is obtained by detecting their respective zero-crossings. At each zero-crossing of the desired frequency a narrow pulse $P_d$ is generated. At each zero-crossing of the standard frequency a narrow pulse $P_O$ is generated. The train of pulses $P_d$ is compared with the train of pulses $P_O$ by the AND gate and whenever the two gated wave trains coincide, the AND gate produces a wide trigger pulse $P_t$. The train of pulses $P_t$ is used to consecutively start and stop simultaneously the desired and standard counters 38 and 40. The time period $t$ between two consecutive pulses $P_t$ is represented in the bottom figure.

This time period $t$ can be obtained from the count $N_O$ as follows:

$$t = N_o/f_o \qquad (1)$$

Where:
$N_o$ = count of Fo
$F_o$ = standard frequency
$t$ = time interval of the frequency measurement.

The measurement of the desired frequency is obtained from the count in the desired frequency counter 38 and the computed time interval $t$.

$$F_D = N_d/t = (N_d/N_o) F_o \qquad (2)$$

Where:
$N_d$ = desired frequency count
$F_D$ = computed value of the desired frequency It can, therefore, be appreciated that the measurement of the desired frequency can be easily computed by multiplying the standard frequency $F_o$ by the ratio between the measured count of the desired frequency and the measured count of the standard frequency during the same time period $t$. Equation 2 can be computed by computer 60.

In one test of the method of this invention, a desired frequency having 1MHz frequency was counted to within a deviation of less than $10^{-3}$Hz in a time period of one second.

While this invention has been described in connection with a particular embodiment thereof, it will be appreciated that modifications may be made without departing from the scope of the attached claims:

What Is Claimed Is:

1. A method of measuring a desired frequency $F_D$ by comparing it to a standard frequency $F_o$, comprising:

detecting each zero-crossing of the desired frequency and generating a narrow pulse at each such zero-crossing, detecting each zero-crossing of the standard frequency and generating a narrow pulse at each such zero-crossing, gating the train of narrow pulses obtained from the desired frequency with the train of narrow pulses obtained from the standard frequency, generating a coincidence pulse whenever said two trains of pulses are coincident, applying consecutive pairs of coincidence pulses to start and stop a pair of counters, one to counter providing a count $N_d$ of the desired frequency and the other counter providing a count $N_o$ of the standard frequency, and obtaining $F_D$ from $F_D = (N_d/N_o)F_o$.

2. A system for measuring a desired frequency $F_D$ by comparing it to a standard frequency $F_o$, comprising:

a first generator for detecting each zero-crossing of the desired frequency and generating a narrow pulse at each such zero-crossing, a second generator for detecting each zero-crossing of the standard frequency and generating a narrow pulse at each such zero-crossing, a second generator for detecting each zero-crossing of the standard frequency and generating a narrow pulse at each such zero-crossing, an AND gate for gating the train of narrow pulses obtained from the desired frequency with the train of narrow pulses obtained from the standard frequency and generating a coincidence pulse whenever said two trains of pulses are coincident, a pair of counters adapted to receive consecutive pairs of coincidence pulses which start and stop said counters, one counter providing a count $N_d$ of the desired frequency and the other counter providing a count $N_o$ of the standard frequency, and a computer for computing $F_D$ from $F_D=(N_d/N_o)F_o$.

* * * * *